United States Patent [19]

McDermott

[11] 4,442,325

[45] Apr. 10, 1984

[54] SWITCHABLE INCREMENTAL ATTENUATION FOR TELEPHONE LINE INTERFACE

[75] Inventor: Noel C. McDermott, Santa Cruz, Calif.

[73] Assignee: Larus Corporation, Santa Clara, Calif.

[21] Appl. No.: 528,668

[22] Filed: Sep. 2, 1983

Related U.S. Application Data

[63] Continuation of Ser. No. 326,490, Dec. 2, 1981, abandoned.

[51] Int. Cl.³ .............................................. H04M 1/76
[52] U.S. Cl. .................................... 179/190; 338/200; 338/221; 333/81 A
[58] Field of Search ................ 179/190, 175.31 E, 178, 179/98; 338/48, 76, 77, 200, 201, 221; 333/81 A, 81 R

[56] References Cited

U.S. PATENT DOCUMENTS

| | | | |
|---|---|---|---|
| 4,086,546 | 4/1978 | Fulp et al. | 333/81 R |
| 4,086,547 | 4/1978 | Nance et al. | 333/81 R |
| 4,086,548 | 4/1978 | Robbins et al. | 333/81 R |
| 4,138,637 | 2/1979 | Weinert | 333/81 R |
| 4,146,853 | 3/1979 | Kiyono et al. | 333/81 R |
| 4,216,444 | 8/1980 | Vergnolle et al. | 333/81 R |
| 4,220,834 | 9/1980 | Holce et al. | 338/221 |
| 4,330,765 | 5/1982 | Patukonis | 333/81 A |
| 4,354,159 | 10/1982 | Schorr | 333/81 R |

Primary Examiner—A. D. Pellinen
Assistant Examiner—L. C. Schroeder
Attorney, Agent, or Firm—Jeffrey J. Blatt

[57] ABSTRACT

A self-contained switchable, incremental attenuator device for interposing in a two line power circuit to attenuate the power level for proper power matching. The device includes a series of modulized, individually switchable attenuator circuits of differing attenuation values mounted upon a pluggable card for interfacing with input and output connectors of a circuit. The attenuation values of the sections are selected such that manipulating the switches will allow attenuation of the power level in the circuit by an integral multiple of a given base incremental value within a given range. The attenuator device is designed to mate with a mounting device for holding the attenuator in contact with the circuit connectors.

16 Claims, 5 Drawing Figures

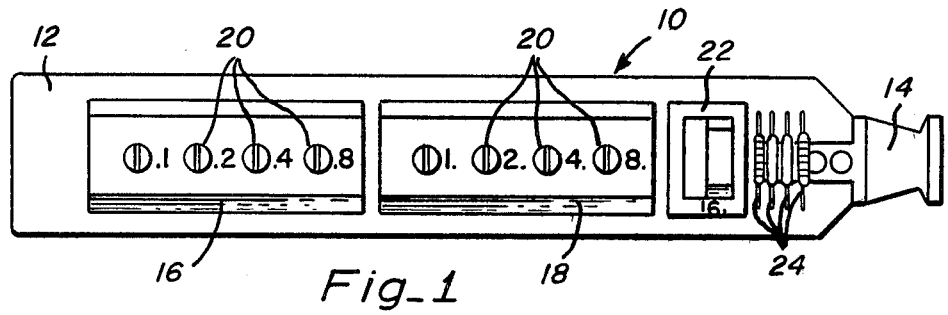
*Fig_1*
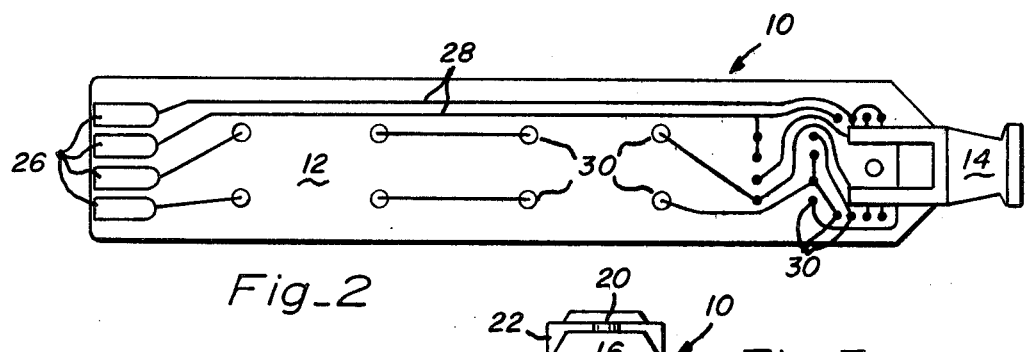
*Fig_2*
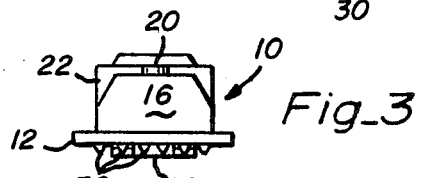
*Fig_3*
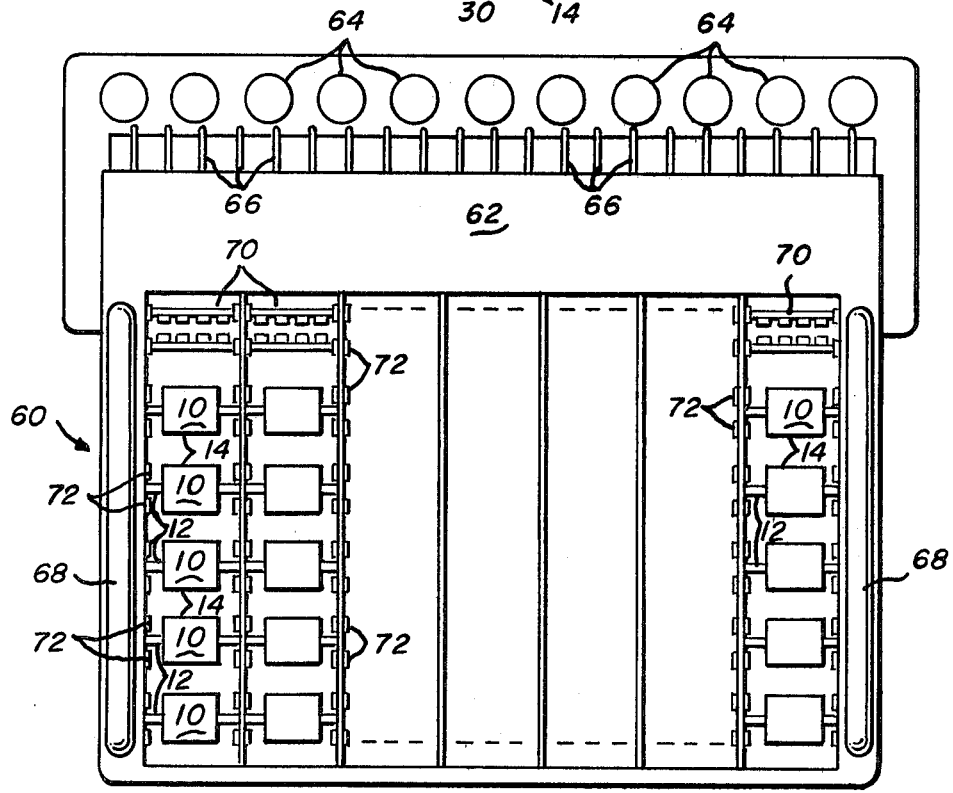
*Fig_5*

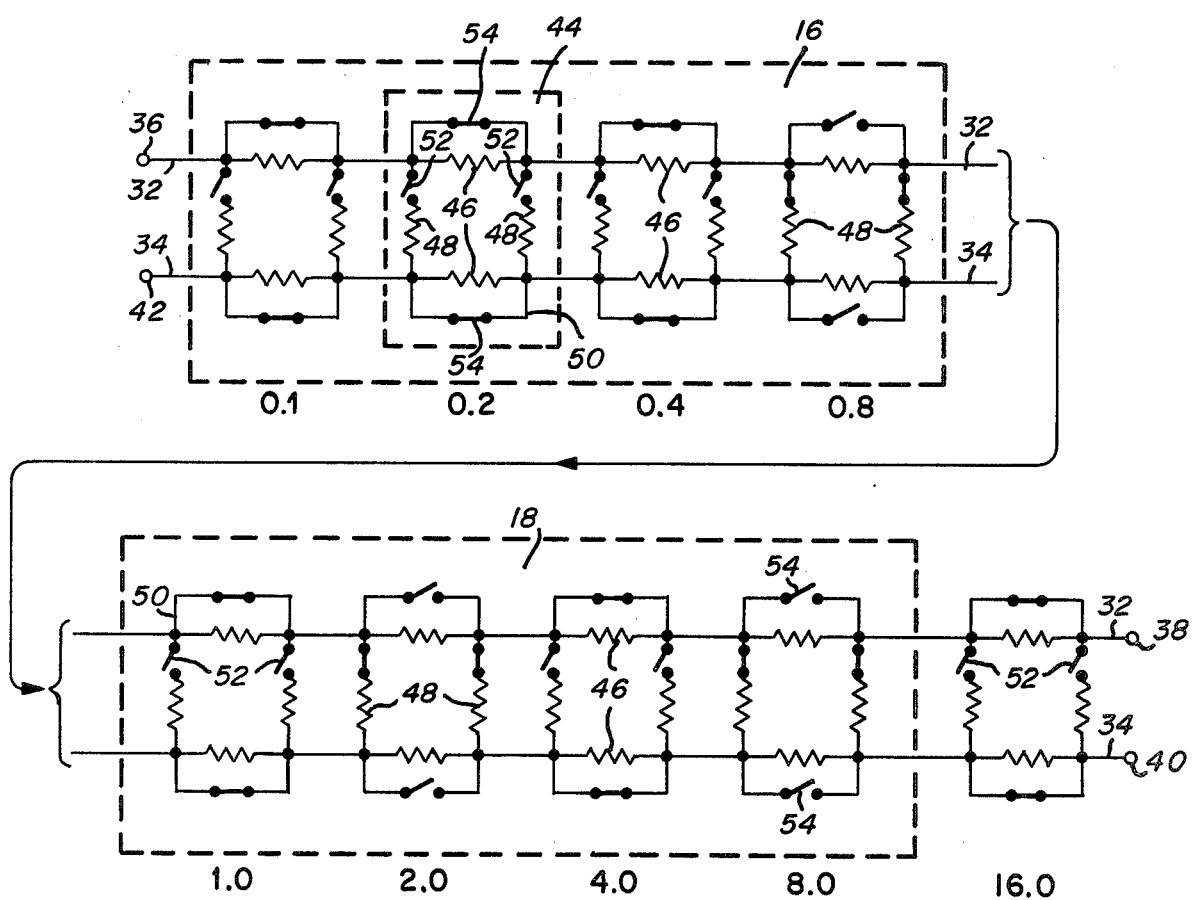
Fig_4

SWITCHABLE INCREMENTAL ATTENUATION FOR TELEPHONE LINE INTERFACE

This application is a continuation of application Ser. No. 326,490, filed Dec. 2, 1981, now abandoned.

BACKGROUND OF THE INVENTION

1. Field of the Invention

The present invention relates generally to telephone circuitry and more particularly to an attenuator device for attenuating the power level at telephone system interfaces.

2. Description of the Prior Art

For various reasons, telephone line circuits in different areas or different telephone systems operate at varying signal power levels. Therefore, it is often desirable to introduce signal power loss into a network to achieve a signal power balance between interfacing systems. This balance minimizes signal reflection. The process of introducing signal power loss into a network is known as attenuation and the devices for accomplishing attenuation are known as attenuators.

It is also desirable to attenuate signal power to minimize talker echo and "singing" in a telephone connection. Talker echo and singing in a telephone conversation are undesirable characteristics which detract from the subjective quality of the connection. It has been found that attenuating the signal power can reduce the detrimental affects. Empirical testing has produced standards for optimal attenuation based on the trade-off between signal power reduction and echo and singing.

Telephone engineers commonly utilize standard tables to determine the amount of signal power attenuation required in a given circuit. The signal power values are expressed in terms of dbm (decibels, absolute) for absolute power measurement as compared to a set base value or in db (decibels) for relative signal power measurement. These tables assume ideal conditions and are dependent on such factors as the mileage between end points of the circuit and the nature of the end points.

However, ideal conditions are rarely obtained. Line resistance and other intentional or unintentionally introduced transmission signal power losses typically reduce the power of the incoming signal by estimable but not precisely predictable amounts for any given point-to-point connection. The interposition of various elements within the circuit may also affect the power levels. Therefore, it is necessary to empirically select the amount of attenuation necessary for each interface.

Prior art attenuation devices were originally in the form of bulky resistance networks mounted on vacuum tube type bases which were plugged into the telephone line circuits at central telephone offices. It was not uncommon to see whole rooms full of these attenuation devices for a relatively small number of interfaces. Subsequently, improved technology led to plug-in attenuator devices of much smaller size. These were typically constructed using microtechnology such as thin and thick film conductor and resistor elements. An attenuator device of this nature is shown and described in U.S. Pat. No. 4,220,834 issued to Thomas J. Holce, et al.

A multiple component plug-in device is disclosed in U.S. Pat. No. 3,908,178, issued to B. E. Johnson and J. E. Danneman. This device uses fewer parts and is somewhat less bulky than other prior art attenuator devices but still requires a large number of components to effectively cover the range of attenuation necessary for telephone uses. The Johnson disclosure further contemplates a three component combination which has multiple connection points and inherent construction complexities which may lead to errors.

Other prior art attenuator devices, such as those including rheostats for adjusting the resistance of specific elements have also been utilized. Devices of this nature have typically been very large and have required significant volume for installation in addition to being unreliable.

The major factors creating disadvantages with prior art attenuation devices are space problems and the unpredictability of the precise attenuation required at a given interface. Those prior art devices which have permitted modification of the power attenuation at a given interface, such as those using rheostats, have been large and thus unacceptable from a spatial standpoint. On the other hand, the small plug-in devices such as disclosed by Holce et al are single attenuation value devices. That is, each plug-in device is permanently set to a given attenuation value. Telephone line systems frequently encounter attenuation requirements from 0.1 db all the way up to 32.5 db. If it is desired that this range be coverable in increments of 0.1 db, then it is necessary for the telephone company to maintain a stock of three-hundred-twenty-five (325) different plug-in attenuator devices.

When an installation is to be made at a given interface, the attenuation required can only be roughly estimated beforehand. Therefore, it frequently occurs that an installer will arrive at the interface point and determine that the plug-in device or devices which he has brought with him are not the ones required at that particular interface. Thus, it is frequently necessary to requisition new parts, make multiple trips to the installation site and otherwise expend unnecessary time, resources and energy in obtaining the proper attenuation. Furthermore, it is not uncommon for circuits to be reassigned or modified such that it becomes necessary to alter the amount of attenuation.

SUMMARY OF THE INVENTION

It is therefore an object of the present invention to provide an attenuator device which can be adjusted to cover, in a single device, the entire range of attenuation necessary in telephone applications.

It is another object of the present invention to provide an attenuator device which is portable, compact and easily installable.

Briefly, a preferred embodiment of the present invention is a switchable, incremental attenuator device for interposing in a two line circuit. The attenuator device includes a series of discrete attenuator modules or sections having incremental attenuation values. The attenuation values selected and the additive nature of the attenuation provide that manipulating the switches controlling the individual sections allows the device to be set at a total attenuation value of any integral multiple, within a given range, of a preselected incremental base attenuation value. The incremental base value is the value of the lowest attenuation section. In one preferred embodiment of the attenuator device, the incremental base value is 0.1 db (decibel). Consequently, one section is set at 0.1 db while the remaining sections are set at 0.2 db, 0.4 db, 0.8 db, 1.0 db, 2.0 db, 4.0 db, 8.0 db and 16.0 db. With sections selected for these values, the installer may manipulate the switches to interpose combinations of sections into the two line circuit to create any attenuation value in increments of 0.1 db, from 0.1 db to 32.5 db, all within a single device. The sections are mounted upon a printed circuit board which is plug-insertable at the interface into connectors in the incoming and outgoing telephone transmission lines.

An advantage of the present invention is that a single attenuator device may be utilized to cover the entire range of attenuation requirements that may be encountered by an installer.

Another advantage of the present invention is that a user need only maintain a single device in inventory as opposed to a wide range of discrete value devices.

A further advantage of the present invention is that the individual devices are compact and require a small amount of space for installation.

Another advantage of the present invention is that a single device may be set to an accurate attenuation value and also may be readily reset if the attenuation requirement changes.

Yet another advantage of the present invention is that the devices are readily interchangeable.

These and other objects and advantages of the present invention will no doubt become obvious to those skilled in the art upon reading the detailed description of the preferred embodiment which is illustrated in the several figures of the drawing.

IN THE DRAWING

FIG. 1 is a top plan view of a switchable, incremental attenuator device according to the present invention;

FIG. 2 is a bottom plan view of the device of FIG. 1;

FIG. 3 is an end elevational view of the device of FIG. 1;

FIG. 4 is a schematic circuit diagram of the device of FIG. 1; and

FIG. 5 is a front plan view of a mounting device for installing the attenuator devices in a typical telephone system.

DETAILED DESCRIPTION OF THE PREFERRED EMBODIMENT

The present invention is a compact, plug-insertable, switchable, incremental attenuator device for use particularly in introducing transmission path signal losses in telephone circuits. A preferred embodiment of the switchable, incremental attenuator device is illustrated in FIGS. 1–3 and designated by the general reference character 10.

The attenuator device 10 includes a printed circuit board 12 which serves as a base for the electrical elements. The printed circuit board is generally in the shape of an elongated rectangle. The printed circuit board 12 is provided with a handle 14 at one end for easy installation and removal.

Mounted upon the printed circuit board 12 are a first module bank 16 and a second module bank 18. Module banks 16 and 18 contain the individual attenuation network sections or sections which attenuate the power delivered through the device 10. Each of the module banks 16 and 18 is provided with a plurality of two-position in-out rotary switches 20, one rotary switch 20 for each section. In this embodiment, there are four of the rotary switches 20 for each bank.

Also mounted upon circuit board 12 are an in-out slide switch 22 and an accompanying set of matched network resistors 24. The in-out slide switch 22 and the matched resistors 24 combine to form an additional attenuation section similar to that represented by each of the rotary switches 20 on the section banks 16 and 18. The section formed by in-out switch 22 and matched resistors 24 is more massive since discrete components are utilized as opposed to thick film components in the sections of the combined banks 16 and 18.

In the preferred embodiment illustrated in FIG. 1, the two position rotary switches 20 and the in-out switch 22 are marked with evaluation numbers. These evaluation numbers, extending from 0.1 for the lowest value section in first module bank 16 up to a value of 16.0 for the section controlled by the in-out switch 22 The evaluation numbers represent the amount of attenuation of the power in the two-line telephone circuit caused by placing the accompanying switch in the activated position. Since the sections are connected in series the attenuation is of the activated sections is additive and a single cumulative total attenuation is achieved for the device.

The reverse side of the printed circuit board 12, illustrated in FIG. 2, shows the electrical connection of the various elements illustrated in FIG. 1. Situated at the end of circuit board 12 and opposite the handle 14 are an array of four conductive pads 26. Conductive pads 26 interface with the in-going and out-going terminals of the lines in the two-line circuit in which attenuation is desired. The conductive pads mate with connection points in a mounting array situated at the point of interface. The signals from the conductive pads 26 are delivered through a network of conductive traces 28 and conductive posts 30, to the remaining components of the device 10. Conductive posts 30 extend through circuit board 12 to the components mounted on the upper surface of the attenuator device 10.

FIG. 3 illustrates the spatial relationship of the elements of the attenuator device 10 as seen from the conductive pad end.

FIG. 4 is a schematic diagram illustrating the electrical operation of the attenuator device 10, and more particularly in the mode illustrated in FIG. 1. The two line direct current circuit which is to be attenuated is illustrated as a first line 32, commonly referred to as a "tip line" and a second line 34, commonly referred to as a "ring line". The first line 32 is provided with a first line input point 36 and a first line output point 38. Similarly, second line 34 is provided with a second line input point 40 and a second line output point 42. The input points 36 and 40 and the output points 38 and 42 correspond to the four conductive pads 26 illustrated in FIG. 2. The first line 32 and the second line 34 have primary physical analogs in the conductive traces 28 of the attenuator device 10.

The circuitry of the attenuator device 10 includes a plurality of discrete attenuation modules or sections 44, one of which is illustrated within the small dotted line of FIG. 4. Each attenuation section 44 is in the nature of a conventional square pad attenuation network.

As illustrated in FIG. 4, the first four attenuation sections 44 make-up the first module bank 16 illustrated in FIG. 1. The contents of first module bank 16 are shown within a large dotted line. Similarly, the second group of four attenuation sections 44 is illustrated within a large dotted line as representing the contents of second module bank 18. The remaining square pad attenuation section 44 represents the combination of the in-out slide switch 22 and the matched resistors 24 illustrated in FIG. 1.

Each attenuation section 44 includes discrete components which are switchably interposable into the circuit formed by first line 32 and second line 34. Each section 44 includes a pair of equivalent series line resistors 46 and a pair of equivalent shunt resistors 48. The line resistors 46 are balanced and connected in series to the first line 32 and the second line 34 while the shunt resistors 48 are balanced and connected in parallel to the first line 32 and the second line 34. Each section 44 is further provided with a bypass connector 50. The interaction of the components within the section 44 is controlled by a slaved pair of shunt switches 52 and a slaved pair of bypass switches 54. Bypass switches 54 allow signals to bypass the series line resistors 46 while shunt switches 52 bring the shunt resistors 48 into the circuit.

Line resistors 46 and shunt resistors 48 have values selected to result in power attenuation of a preselected decibel value. These resistors are selected in accordance with commonly known square pad attenuation techniques and square pad network equations to achieve the values shown in FIG. 1 and FIG. 4 for each section.

The shunt switches 52 are slaved not only to each other but also to the bypass switches 54. There are only two modes in which the four switches can be found. Either both shunt switches 52 will be open and both bypass switches 54 will be closed or the opposite is true, both shunt switches 52 will be closed and both bypass switches will be open. The two modes are illustrated in FIG. 4 by the attenuation sections 44 corresponding to the 0.2 section and the 0.8 section.

When both shunt switches 52 are open and both bypass switches 54 are closed, the section 44 is said to be in the bypass or "out" mode. When the section 44 is in the bypass mode, the electrical signals will be carried through the bypass connectors 50 and will not interact with either the line resistors 46 or the shunt resistors 48. Therefore, when a section 44 is in the bypass mode, no attenuation will result from that section.

When the reverse switch positions are obtained, then the section is in the activated or "in" mode. In this mode, the electrical signals have no paths other than through the line resistors 46 and the shunt resistors 48. Thus, the square pad attenuation is achieved and the signal power of the two line circuit will be reduced by a factor dependent on the resistor values.

The diagram of FIG. 4 corresponds to the illustration of FIG. 1 relating to the value of attenuation. As can be seen in FIG. 1, the turn slots of rotary switches 20 for the 0.1, 0.2, 0.4, 1.0 and 4.0 sections are arrayed to be perpendicular to the long axis of circuit board 12. This corresponds to the bypass mode. Furthermore, in-out slide switch 22 is also shown in the bypass mode. The rotary switches 20 corresponding to the 0.8, 2.0 and 8.0 attenuation sections 44 are shown as having their turn slots arrayed parallel to the long axis of the circuit board 12. This position corresponds to the activated mode.

Thus, in FIG. 4, the 0.8, 2.0 and 8.0 attenuation sections 44 are shown as being in the activated mode. In this mode the full attenuation of each section is delivered to the two line circuit. Since each of the sections 44 is connected in series, the attenuation is linearly additive according to the low super position and a cumulative value is obtained. Therefore, the total attenuation illustrated in both FIGS. 1 and 4 is 10.8 db.

Another commonly utilized base incremental value is 0.25 db. In such a case the eight sections 44 in the first and second module banks 16 and 18 will provide total possible attenuation of 41.75 db in increments of 0.25 db. Since this range is sufficient for most purposes the additional section 44 created by in-out slide switch 22 and matched resistors 24 is not necessary when 0.25 db is selected as the base incremental value.

The components are selected from common commercial sources. Printed circuit board 12 is a standard rigid nonconductive circuit board material. The module banks 16 and 18, including the two-position rotary switches 20 are off the shelf items and may be custom constructed with switch controlled circuitry of the desired square pad attenuation network type. The line resistors 46 and shunt resistors 48 are constructed using thick-film deposition techniques. The slaved shunt switches 52 and bypass switches 54, controlled by rotary switches 20, are ordinary microswitches for film deposit circuits.

Since the attenuator devices 10 of the present invention are different in configuration from prior art attenuators, it is necessary to utilize customized mounting hardware. The elongated nature of the circuit board 12 makes it somewhat unstable if supported only at the conductive pad 26 end. Various mounting hardware may be constructed to support the attenuator devices in different configurations and orientations.

One embodiment of a device for mounting the attenuator devices 10 is illustrated in FIG. 5 and designated by the general reference character 60. The mounting device 60 includes a frame 62 in a generally cubical shape. The rear upper portion of frame 62 includes a plurality of wire guides 64 for receiving telephone wires. The wires are connected to the mounting device at a plurality of wire connection posts 66. The frame 62 is also provided with a pair of handles 68 for grasping the mounting device 60.

The mounting device 60 illustrated is designed for providing an interface situs for forty-nine two-line circuits. Each circuit will include two wires passing through wire guide holes 64 and attached to connection posts 66.

The front portion of frame 62 is open and divided into a plurality of mounting slots 70. In the embodiment shown, forty-nine mounting slots 70 are provided, one for each two-line circuit. Each mounting slot 70 has a depth slightly greater than the length of the circuit board 12 such that when an attenuation device 10 is mounted in the slot 70 the front surface of handle 12 is even with the front of handles 68.

Each mounting slot includes, in the interior portion thereof, two pairs of opposed support ridges 72. The support ridges 72 extend the entire depth of slots 70 and provide longitudinal support for the attenuator devices 10. Support ridges 10 are ordinarily nonconductive, rigid materials formed to receive therebetween the edges of circuit boards 12 and maintain the attenuator devices 10 in lateral alignment. The attenuator devices 10 may only be mounted or removed from mounting slots 70 by sliding the circuit board 12 into slot 70 between the support ridges 72.

At the rear of each mounting slot 70 is situated a female connecting array 74 for receiving attenuator device 10. The conducting pads 26 mate with female connecting array 74 to form a complete electrical connection. In this manner the attenuator device 10 is interposed into the two line circuit corresponding to the mounting slot 70.

Various configurations of mounting devices may be constructed but the basic configuration of the mounting slot 70 will remain the same. The frame 62 may be modified to include different numbers of slots 70 or may have the slots oriented transversely to the orientation of FIG. 5. Any reasonable configuration necessary to correspond to the space available in a telephone facility may be adopted.

Although the present invention has been described above in terms of the presently preferred embodiments, it is to be understood that such description is not all-inclusive and is not to be considered as limiting. Accordingly, the appended claims are to be interpreted as including all subject matter falling within the true spirit and scope of the present invention.

What is claimed is:

1. A device for providing selectively incremental attenuation in a telephone circuit using discrete resistive values, comprising:
    a plurality of serially coupled individually switchable attenuation sections, each of said attenuation sections including switching means for selectively determining the attenuation value of each section, permitting the selection of the total attenuation value of said device by integral multiples of a selected incremental base unit, within a range generally of 0–41.75 db;
    frame including mounting means for receiving and supporting said attenuation device;
    connecting means for connecting said serially coupled attenuator sections to said telephone circuit;
    whereby incremental attenuation in said telephone circuit is provided.

2. The device as defined by claim 1, wherein said incremental base unit is 0.1 db and said attenuation range is generally 0.1–32.5 db.

3. The device as defined by claim 1, wherein said incremental base unit is 0.25 db and said attenuation range is 0.25–41.75 db.

4. The device as defined by claim 1, wherein each attenuation section includes a balanced square pad attenuation network, bypass means and a two position switch such that when said two position switch is in a first position said square pad attenuation network is interposed into said telephone circuit and when said two position switch is in a second position the bypass means are actuated and said square pad attenuation network is not interposed in said telephone circuit.

5. The device as defined by claim 4, wherein the plurality of individually switchable attenuation sections includes eight sections divided into two banks, the first bank of four sections includes sections having attenuation values of said incremental base unit, two base units, four base units and eight base units, respectively, while the second of said banks includes sections having attenuation values of ten base units, twenty base units, forty base units and eighty base units, respectively.

6. The device as defined by claim 5, wherein said banks are arrayed on one side of a portion of a printed circuit board and are connected to each other and to said connecting means by a series of conductive traces including four conductive pads on said circuit board for mating with respective input and output connectors of each line of the telephone circuit.

7. The device as defined by claim 6, wherein said banks of attenuation sections are arrayed singly to provide attenuation of an individual telephone line.

8. The devices as defined by claim 7, wherein said mounting means includes mounting slots for receiving said printed circuit board.

9. The device as defined by claim 8, wherein each of said mounting slots includes a pair of non-conducting opposed support ridges to receive the edges of said printed circuit board.

10. The device as defined by claim 7, wherein a connecting array is provided for receiving and coupling said attenuator device to said telephone circuit.

11. An attenuator device for attenuating incoming power levels at an interface in a two line telephone circuit, the improvement comprising:
    a series of incremental individually switchable attenuation sections including switching means for selectively determining the attenuation value of each section, permitting the selection by integral multiples of a preselected incremental base unit, within a range generally of 0–41.75 db, of the total attenuation of said device;
    each attenuation section including a balanced square pad resistive attenuation network, bypass means and a switch such that when said switch is in a first position said square pad attenuation network is interposed into said telephone line and when said switch is in a second position the bypass means are actuated and said square pad attenuation network is not interposed in said telephone line;
    a frame including mounting means for receiving and supporting said attenuation device;
    connecting means for connecting said serially coupled attenuation sections to said two line telephone circuit;
    whereby incremental attenuation in said telephone circuit is provided.

12. The device as defined by claim 11, wherein said incremental base unit is 0.1 db and said attenuation range is generally 0.1–32.5 db.

13. The device as defined by claim 11, wherein said incremental base unit is 0.25 db and said attenuation range is 0.25–41.75 db.

14. The device as defined by claim 11, wherein said series of attenuation section are mounted on a printed circuit board.

15. The device as defined by claim 11, wherein said frame includes a plurality of mounting slots, each of said slots including support and guide means for supporting and receiving the edges of said printed circuit board.

16. The apparatus as defined in claim 15, wherein said support and guide means includes two pairs of non-conducting opposed support ridges to receive the edges of said printed circuit board.

* * * * *

REEXAMINATION CERTIFICATE (806th)
United States Patent [19]
McDermott

[11] B1 4,442,325
[45] Certificate Issued Jan. 5, 1988

[54] SWITCHABLE INCREMENTAL ATTENUATION FOR TELEPHONE LINE INTERFACE

[75] Inventor: Noel C. McDermott, Santa Cruz, Calif.

[73] Assignee: Larus Corporation, Santa Clara, Calif.

Reexamination Request:
No. 90/001,097, Sep. 30, 1986

Reexamination Certificate for:
Patent No.: 4,442,325
Issued: Apr. 10, 1984
Appl. No.: 528,668
Filed: Sep. 2, 1983

Related U.S. Application Data

[63] Continuation of Ser. No. 326,490, Dec. 2, 1981, abandoned.

[51] Int. Cl.⁴ .................................... H04M 1/76
[52] U.S. Cl. ........................... 379/398; 333/81 A; 338/200; 338/221
[58] Field of Search ............... 338/48, 76, 77, 200, 338/201, 221; 333/81 A, 81 R; 379/398, 399, 403

[56] References Cited
U.S. PATENT DOCUMENTS 4,024,346  5/1977  McDermott ............... 179/98
4,220,834  9/1980  Holce et al. .............. 179/98

OTHER PUBLICATIONS

Parham, "Unique Switchable Attenuator Built Into PC Board", *Telephone Engineer & Management*, Jun. 1, 1980. (2 pages).
Bourns, Inc. Application Notes, "An Application in a 2-4 Wire Simplex Circuit", Jun. 12, 1980.
Kentrox Industries, Inc. catalog brochure, dated Mar. 1979, pp. 1-1A, 1-1B, 1-2A and 1-2B.
Kentrox Industries, Inc. catalog brochure, pp. VIII-2A, VIII-2B, VIII-2C, VIII-2D, dated Jun., 1980 and VIII-3A, VIII-3B, VIII-3C and VIII-3D, dated Mar., 1979, exhibit B.
Kentrox Industries, Inc., brochure, dated Mar., 1979, pp. X-1A, X-1B, X-2A, X-2B, X-2C and X-2D, exhibit C.

*Primary Examiner*—James L. Dwyer

[57] ABSTRACT

A self-contained switchable, incremental attenuator device for interposing in a two line power circuit to attenuate the power level for proper power matching. The device includes a series of modulized, individually switchable attenuator circuits of differing attenuation values mounted upon a pluggable card for interfacing with input and output connectors of a circuit. The attenuation values of the sections are selected such that manipulating the switches will allow attenuation of the power level in the circuit by an integral multiple of a given base incremental value within a given range. The attenuator device is designed to mate with a mounting device for holding the attenuator in contact with the circuit connectors.

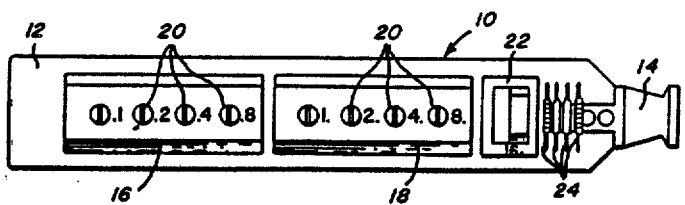

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–16 are cancelled.

New claims 17–20 are added and determined to be patentable.

*17. A device for providing selectively incremental attenuation in a telephone circuit using discrete resistive values, comprising:*

*a plurality of serially coupled individually switchable attenuation sections, each of said attenuation sections including switching means for selectively determining the attenuation value of each section, permitting the selection of the total attenuation value of said device by integral multiples of a selected incremental base unit, within a range generally of 0–41.75 db, wherein the plurality of individually switchable attenuation sections includes eight sections of thick film resistor networks divided into two banks, the first bank of four sections includes sections having attenuation values of said incremental base unit, two base units, four base units and eight base units, respectively, while the second of said banks includes sections having attenuation values of ten base units, twenty base units, forty base units and eighty base units, respectively, and said plurality of individually switchable attenuation sections further includes a section comprising a set of discrete matched network resistors having an attenuation value of one-hundred sixty base units;*

*a circuit board to which said serially coupled attenuation sections are physically attached and electrically connected;*

*frame including mounting means for slideably receiving and supporting said circuit board;*

*connecting means for connecting said circuit board to said telephone circuit;*

*whereby incremental attenuation in said telephone circuit is provided.*

*18. The device as defined by claim 17, wherein said circuit board comprises a printed circuit board and said banks and said discrete resistors are arrayed on one side of a portion of said printed circuit board and are connected to each other and to said connecting means by a series of conductive traces including four conductive pads on said circuit board for mating with respective input and output connectors of each line of the telephone circuit.*

*19. The device as defined by claim 18 wherein said frame includes a plurality of mounting slots, each of said slots including support and guide means for supporting and receiving the edges of said printed circuit board.*

*20. The apparatus as defined in claim 19, wherein said support and guide means includes two pairs of non-conducting opposed support ridges to receive the edges of said printed circuit board.*

* * * * *